United States Patent [19]

Kronogård, deceased et al.

[11] Patent Number: 4,566,279
[45] Date of Patent: Jan. 28, 1986

[54] VEHICLE PROPULSION PLANT

[75] Inventors: Sven O. Kronogård, deceased, late of Lomma, Sweden, by Allen Lindén, administrator; Clas O. Kronogård, Gråbo; Håkan Kronogård, Lund, both of Sweden

[73] Assignee: AB Volvo, Gothenburg, Sweden

[21] Appl. No.: 669,892

[22] Filed: Nov. 9, 1984

Related U.S. Application Data

[62] Division of Ser. No. 302,626, Sep. 15, 1981, abandoned.

[30] Foreign Application Priority Data

Sep. 29, 1980 [SE] Sweden ............................... 8006805

[51] Int. Cl.⁴ .............................................. F02B 72/00
[52] U.S. Cl. ......................................... 60/718; 60/709; 74/661; 74/689
[58] Field of Search ................. 60/698, 709, 711, 714, 60/716, 718; 123/DIG. 8; 74/661, 665 D, 689

[56] References Cited

U.S. PATENT DOCUMENTS

| 2,084,187 | 6/1937 | Brehob | 60/714 |
| 3,194,087 | 7/1965 | Kronogard | 74/661 |
| 4,106,603 | 8/1978 | Walter | 74/661 X |

Primary Examiner—Stephen F. Husar
Attorney, Agent, or Firm—Holman & Stern

[57] ABSTRACT

A vehicle power plant comprising a number of engine working cylinders arranged in two groups with different numbers of cylinders and/or with different power outputs, the parts being individually connectable to a common power take-off shaft by a continuously variable belt transmission. A gearing, including a reverse step, is mounted with its axes of rotation parallel to the crank shafts of the engines and connects the belt transmission to the vehicle output shaft. This vehicle power plant produces good fuel economy, high top power output, low exhaust emissions, and good acceleration capacity.

6 Claims, 4 Drawing Figures

VEHICLE PROPULSION PLANT

This application is a divisional application of U.S. Ser. No. 302,626, filed Sept. 15, 1981, now abandoned.

BACKGROUND OF THE INVENTION

1. Field of the Invention

This invention relates to vehicle propulsion plants and more particular to such propulsion plants wherein the engine may be coupled and uncoupled as desired or required.

During recent years the development of vehicle propulsion plants has been directed towards fuel economy, while maintaining a high power output to meet increasingly intense traffic. Simultaneously, environmental considerations demand a reduction of exhaust gas emissons. The standards concerning fuel economy, purification of exhaust gases and safety, the latter including capacity for acceleration and versatility, may be expected to be more rigid in the future.

In order to meet the conditions above referred to, which to some extent act against each other, a complex technique will be required. A carburetor engine (an Otto-engine) is best suited among the piston engines to meet the primary requirements concerning high load performance, low weight and small volume, as well as low production costs, but there are difficulties in obtaining a low fuel consumption, especially during part-load, which is of decided importance when private cars are concerned. This is particularly noticable when traffic safety, carrying capacity, and versatility require a comparatively high maximum power output.

It is a well known fact, that the thermal efficiency will be increased when the compression ratio is increased. In contradistinction to the diesel engine an Otto-engine is supplied with a mixture of fuel and air, and this mixture has a tendency towards an uncontrolled and detrimental ignition (so called knocking), when the compression ratio is too high. This will impose close limits upon the maximum ratio of an Otto-engine. On the other hand the power output is governed by "throttle-control" of the air inlet, which results in a lower volumetric efficiency and consequently a reduced compression ratio, and also a lower operating efficiency.

2. Brief Summary of the Invention

Instead of reducing the power output from all cylinders, the objective should be to reduce the number of active cylinders, and to let the still active cylinders work under a high load.

The number of occasionally operating cylinders may be reduced by locally shutting off the fuel supply to some cylinders, or by manipulating the valve gear operating mechanism. That will, however, require rather complicated control gear, and frictional losses due to the pistons reciprocating in idle position cannot be avoided.

The objective of the present invention is to provide a subdivision of the cylinders of the plant into parts, which may be switched in and out as required. It is for instance possible to form one part so it takes about ⅓ of the maximum output, and a second part suited to take about ⅔ of the maximum output. It will then be possible to operate the engine within three different output ranges, with a high efficiency in all of them, depending upon the fact that it is possible to rely upon a small throttle governing within each range, and thus a high compression ratio in the occasionally serviceable cylinders. The engine parts are connectable to the vehicle output shaft by a belt transmission providing a compact and versatile unit.

The improved fuel economy during part load will in the first hand result in a reduction of the exhaust gas volume, and as the combustion within the cylinders will occur about at the compression ratio for which the engine is designed, the content of dangerous emission products will be maintained at low, controlled values.

A vehicle propulsion plant according to the invention includes first and second internal combustion engine parts mounted end to end with their crank shafts aligned and connectable to a propulsion shaft. A continuously variable belt transmission is connectable to at least one of said internal combustion engine part, a gearing mounted with its axes of rotation parallel to the crank shafts, connects said belt transmission to the vehicle propulsion shaft, and means are provided for interconnecting the engine parts with respect to at least one secondary operating fluid.

The plant preferably includes a selectively operable clutch connecting the crank shaft of each of said first and second engine part to the belt transmission.

In one embodiment the plant may include a collecting input member at the gear means, a torque converter, a free wheel clutch and a chain transmission connecting the first engine part with the collecting input member, while the variable belt transmission connects the second engine part with the collecting input member.

In a further development the gearing may be a planetary gearing, having a sun wheel and a ring wheel, as well as planets meshing therewith, while the collecting input member includes a shaft connected to said sun wheel, and the chain transmission and the belt transmission are individually connectable to the collecting input member shaft by way of lockable free wheel clutches.

The belt transmission may further be connected to an energy storing fly-wheel accumulator by way of an selectively operable clutch means.

The plant may include a second torque transfer path parallel to the belt transmission, for driving the auxiliaries of the propulsion plant and connectable to the gearing means by way of two oppositely acting free wheel clutches.

BRIEF DESCRIPTION OF THE DRAWINGS

The invention will now be described in greater detail with reference to the accompanying drawings wherein.

DESCRIPTION OF SOME PREFERRED EMBODIMENTS

In a conventional six-cylinder internal combustion engine proposals have been made for switching out certain cylinders during part load running, either by cutting off the fuel supply, or by manipulating the valve gear. Such arrangements are, however, complicated and involve problems concerning driving safety. Frictional losses and wear in the cylinders, not providing any output, must also be considered.

Figure 1:
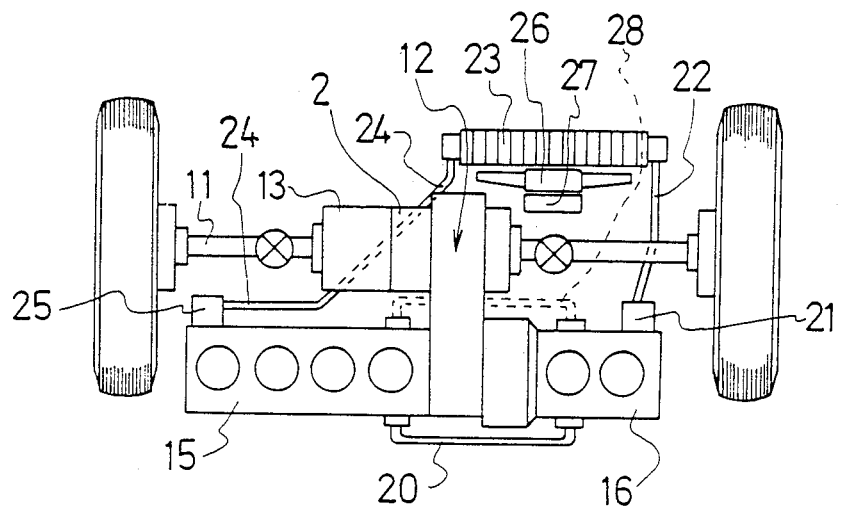
FIG. 1 is a schematic illustration showning a basic embodiment of the invention.

The present invention is illustrated in FIG. 1, where a six-cylinder engine plant is adapted for driving at the front axle 11 of a vehicle. A conventional six-cylinder engine may be considered as being divided into a four-cylinder base part 15 and a two-cylinder additional part 16, which each by clutches are connectable to a transmission 12 which by way of planetary gearing 2 and differential 27 drives the front axle 11. This will be better described in the following figures. The two parts are mounted end to end with their crank shafts aligned.

Different combinations of base part, additional part and transmission are possible, and it is evident that the number of cylinders in the various engine parts may vary. It is, however, often advantageous to allot a higher output to one of the parts, which may be attained by a higher number of cylinders and/or by supercharging.

The requirement concerning power output may change comparatively rapidly, on certain occasions instantly, and it may means a delay, or on some occasions even a stalling of the plant, if a need for switching in the additional part suddenly occurs.

The governing system may be designed differently depending upon the type of vehicle where the plant is to be used, and upon how one intends to operate the two parts in order to obtain the best results.

In a simple arrangement the four-cylinder part 15 is used as the base part, and the two-cylinder part 16 only when a high output is needed. Switching-in and governing the additional part may then occur by a so called "kick-down" arrangement at the gas pedal.

For extreme economy driving the additional part 16 may be used for driving on level ground and/or at low load. To cover an increased power need the base part 15 is used (alone), and finally the additional part 16 is switched-in, when top output is needed. During a long driving sequence it may be necessary to switch the prime mover parts in and out several times.

In order to maintain the prime mover part occasionally switched-out prepared for a rapid switched-in, it is "conditioned" in the first hand by the cooling systems of the two parts being interconnected. The exit for the cooling water from part 15 is connected to the cooling water inlet of part 16 by a conduit 20. The cooling water pump 21 of the additional part 16 is connected to a cooler 23 by a conduit 22, and the cooler is by way of a conduit 24 connected to the cooling water pump 25 of prime mover part 15.

The cooler is provided with a conventional fan 26, which is a simple installation may be driven directly from the base part 15. When the vehicle is driven solely by the additional part 16 the cooling effect of the cooler 23 plus the bigger base part will be sufficient on most occasions, even without the fan operating. Alternatively, the fan 26 may be driven by an electric motor 27, which is governed by a thermostat mounted at conduit 24. In this manner a prime mover part, which is temporarily switched-out, may be kept warm and ready for immediate service.

The base part 15 may be provided with a starting motor, while the additional part 16 may be started by means of the transmission 12. This is, of course, provided with clutches, so the prime mover parts may be switched in and out as desired. The starting motor and an electric generator may alternatively be driven by the transmission 12. No fly-wheel will be necessary, its function is taken over by the clutch at the base part, this clutch preferably being of the multi-lamella type.

The additional part 16 is preferably designed so that it has a low inertia, which may be attained by manufacturing its pistons and connecting rods of ceramics, light-metal or composite material.

In order further to increase the adaptability for rapid switching-in the lubrication system of the two prime mover parts may be interconnected, which is indicated by the connection 28 shown in broken lines.

Figure 2:
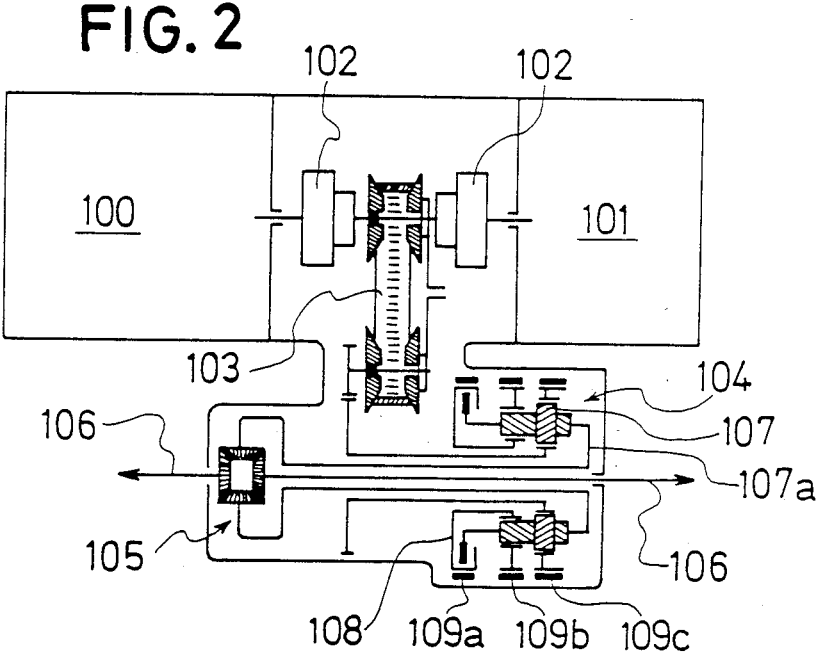
FIG. 2 is a schematic illustration of an embodiment of the invention where the transmission arrangements include an infinitely variable belt transmission.
Figure 3:
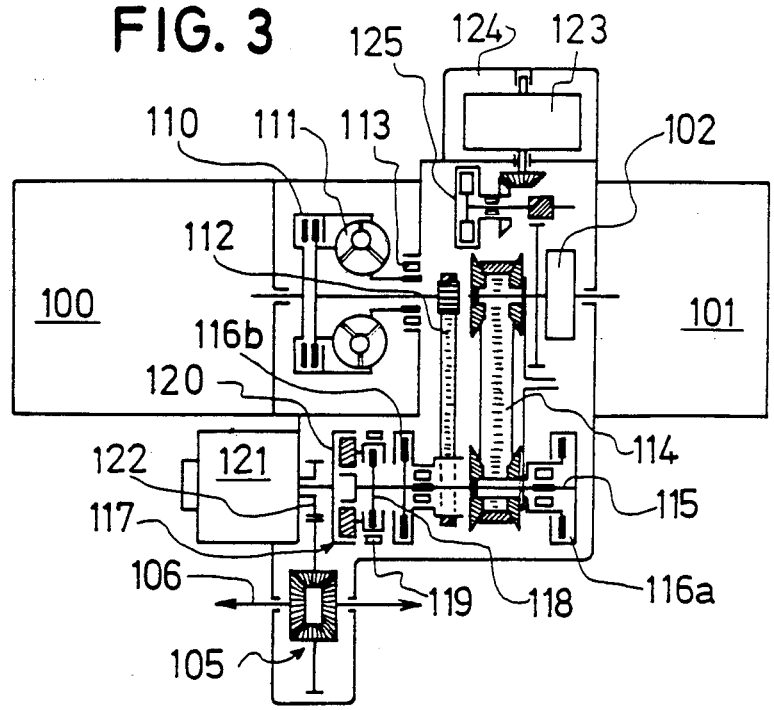
FIG. 3 is a view similar to FIG. 2 showing a further development of the belt transmission arrangement.
Figure 4:
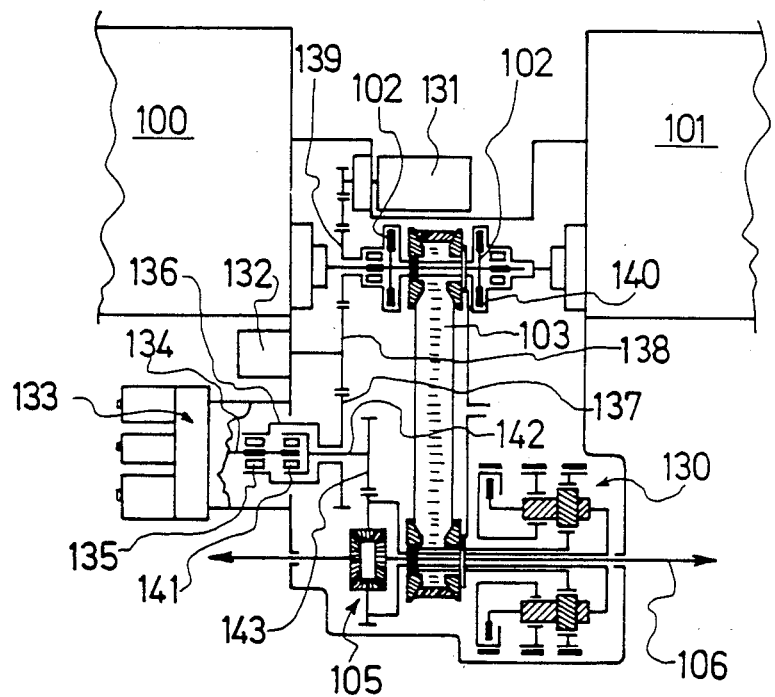
FIG. 4 is a view similar to FIG. 3 showing a plant including a torque transfer path in parallel to the belt transmission.

FIGS. 2, 3 and 4 show different arrangements of the transmission 12 between the prime mover parts as shown in FIG. 1.

The base part, which may be a three-cylinder engine, is denoted by 100, and the additional part, which may be a two-cylinder engine, is denoted by 101. Selectively operable clutches 102 will connect the prime mover parts with a continuously variable belt transmission 103, which drives a multistage planetary gearing 104 including a reverse step connected to a differential 105, which drives at the front axle 16 of the vehicle.

The belt transmission is schematically shown, and is of any well known design, where a wedge-wheel at each pair of wheels is operable by built-in hydraulic servo-motors, which may be automatically governed.

The planetary gearing 104 has stepped planets 107 mounted upon a carrier 107a and cooperating with two ring wheels and two sun wheels. One of the latter receives the input from the belt transmission, and the other sun wheel carries the housing of a lamella clutch 108, the lamella of which is mounted at the planet carrier. There are three brakes, one 109a at the clutch housing, and one 109b and 109c, respectively, at each of the ring wheels.

An engagement of brake 109c will provide a low gear step, an arrangement of brake 109a will provide an intermediate gear step, and the engagement of the clutch 108 will provide a direct transfer. Reverse driving is obtained when brake 109b is applied.

The prime mover part may be substituted, or augmented, by a fly-wheel accumulator, or some other device for storing braking energy, or occasional surplus of energy.

FIG. 3 shows a more developed transmission arrangement, it being evident that the number of gear steps in the planetary gearing can be reduced if the exchange ratio of the belt transmission is high. The same reference numerals as in FIG. 2 are used, whenever applicable.

The base part 100 is by way of a lamella clutch 110 and a torque converter 111 connected to a chain transmission 112. The torque converter 111 is carried by a free wheel 113, and the clutch 110 is adapted for directly connecting the engine crank shaft with the driving wheel of the chain transmission.

The additional part 101 is connectable to the variable belt transmission 114 by way of a clutch 102, the belt transmission being adapted to drive upon the same shaft 115 as the chain transmission 112. The belt transmission 114 is provided with a lock-up free wheel 116a. The chain transmission is likewise connected to the collecting shaft 115 by a lock-up free wheel 116b.

The collecting shaft 115 drives a planetary gearing 117 by way of its sun wheel. The gearing is provided with a lamella clutch 118 for direct connection, and with a brake 119 for causing reverse driving. The ring wheel 120 of the planetary gearing is connected to a shaft entering a transmission 121. The output shaft thereof drives the differential 105 by way of two meshing gear wheels 122.

A fly-wheel accumulator 123, enclosed in a casing 124 in which a vacuum is maintained, is connectable to an output shaft from the clutch 102 at the additional prime mover part 101 by means of a lock-up free wheel clutch 125. The additional part 101 may temporarily be operated to drive the fly-wheel accumulator, but braking energy from the base part may be transferred thereto by way of the belt transmission 114 and the free wheels. The stored energy may be transferred automatically to the vehicle drive axle, when the additional power is required.

With the embodiment according to FIG. 4 the base part 100 and the additional part 101 are individually connectable to a continuously variable belt transmission 103 by lock-up free wheel clutches 102. A planetary gearing 130 of the same type as described in connection with FIG. 2 drives the vehicle shaft 106 by way of a differential 105. The components of the planetary gearing are the same as those corresponding components having reference numerals in FIG. 2.

A starting motor for the plant is denoted by 131, an oil pump for the various transmissions is denoted by 132, and the other, conventional auxiliaries are generally denoted by 133. A driving shaft 134 to the latter is by way of a free wheel 135 connected to a housing 136 which is mounted upon a gear wheel 137, forming part of a gear transmission from the starting motor 131. The oil pump 132 is driven by a gear wheel 138 in this transmission, and a further wheel 139 is connected to the housing 140, common to both clutches 102.

A second free wheel 141 is fitted in housing 136 at the auxiliary apparatus 133, which by way of a shaft 142 and a gear wheel 143 drives the differential 105.

There are thus two parallel transmission paths between the crank shafts of the prime mover parts and the vehicle axle, and it is evident that it is possible to start either of the primer motor parts 100 or 101 by way of the common clutch housing 140, and that furthermore the oil pump 132 will be put into operation as soon as any of the prime motors is started. The auxiliaries will also be operable by way of the free wheels 135 and 141, independently of which of the prime motors is running.

The specification and the drawings show a number of embodiments, but those must not be regarded in a limiting sense, as further modifications may be made within the scope of the appended claims.

We claim:

1. A vechicle propulsion plant comprising first and second internal combustion engine parts mounted end to end having crank shafts aligned and connectable to a propulsion shaft, a continuously variable belt transmission connectable to at least one of said internal combustion engines, and gear means mounted with its axes of rotation parallel to said crank shafts, for connecting said belt transmission to said vehicle propulsion shaft, and means interconnecting said engine parts with respect to at least one secondary operating fluid.

2. A vehicle propulsion plant according to claim 1, and further comprising a selectively operable clutch connecting the crank shaft of each of said first and second engine parts to said belt transmission.

3. A vehicle propulsion plant according to claim 1, and further comprising a collecting input member at said gear means, a torque converter, a free wheel clutch and a chain transmission connecting said first engine part with said collecting input member, and said variable belt transmission connecting said second engine part with said collecting input member.

4. A vehicle propulsion plant according to claim 3, wherein said gear means is a planetary gearing, having a sun wheel and a ring wheel, as well as planets meshing therewith, and said collecting input member includes a shaft connected to said sun wheel, said chain transmission and said belt transmission being individually connectable to said collecting input member shaft by means of lockable free wheel clutches.

5. A vehicle propulsion plant according to claim 4, wherein said belt transmission is further connected to an energy storing fly-wheel accumulator by means of a selectively operable clutch means.

6. A vehicle propulsion plant according to claim 1, and further comprising a second torque transfer path parallel to said belt transmission for driving the auxiliaries of the propulsion plant and connectable to said gear means by means of two oppositely acting free wheel clutches.

* * * * *